United States Patent [19]

Stas et al.

[11] Patent Number: 5,319,628
[45] Date of Patent: Jun. 7, 1994

[54] DEVICE FOR RECORDING AN INFORMATION SIGNAL AND A RELATED AUXILIARY SIGNAL

[75] Inventors: Danny H. S. Stas, Hasselt, Belgium; Gerardus J. Fisser, Eindhoven, Netherlands

[73] Assignee: U.S. Philips Corporation, New York, N.Y.

[21] Appl. No.: 902,644

[22] Filed: Jun. 23, 1992

[30] Foreign Application Priority Data

Jul. 8, 1991 [NL] Netherlands .......................... 9101188

[51] Int. Cl.$^5$ .............................................. G11B 7/00
[52] U.S. Cl. .......................................... 369/54; 369/58
[58] Field of Search .................. 369/44.32, 48, 54, 58, 369/59, 32, 44.38, 44.39, 44.33, 47; 360/49, 72.2, 55; 371/61, 65

[56] References Cited

U.S. PATENT DOCUMENTS 4,807,057 2/1989 Kashida et al. ................... 360/72.2

FOREIGN PATENT DOCUMENTS

0390268 10/1990 European Pat. Off. .
57-64449 1/1982 Japan .
01264604 10/1989 Japan .

Primary Examiner—W. R. Young
Assistant Examiner—Nabil Hindi
Attorney, Agent, or Firm—Larry Eason

[57] ABSTRACT

A device for recording a sequence of information signals on a record carrier includes a signal presence detector which detects the presence of the information signals to be recorded on the basis of the information therein. Recording is terminated if the presence of such information has not been detected at least for a predetermined time interval (T3; T1). A new recording is initiated in reaction to a transition from a state in which the presence of information to be recorded is not detected, to a state in which the presence of such information is detected. In the case of a received analog information signal the presence of information to be recorded is established on the basis of the level of such signal. For a received digital audio information signal, the presence of information to be recorded is detected on the basis of the subcode information and audio information in such signal. The device also provides an automatic adaptation of such subcode information so as to relate it to the number of already recorded information signals, such as the relative time code and track number included in the subcode of a Compact Disc signal.

18 Claims, 4 Drawing Sheets

DEVICE FOR RECORDING AN INFORMATION SIGNAL AND A RELATED AUXILIARY SIGNAL

BACKGROUND OF THE INVENTION

1. Field of the Invention

The invention relates to a device for recording a sequence of information signals on a record carrier, the device comprising an input for receiving the information signals to be recorded and the means for recording received main information signals together with additional information on the record carrier.

2. Description of the Related Art

Such a device is known from European Patent application EP-A-0 390 268. In that document a device is described for recording information signals in the tracks or the so-called Compact Disc record carrier of a write-once type. Due to the fact that the record carrier is of the write-once type, it is important that the recording be terminated substantially immediately after the end of the received information signal, so that recording of non-useful information in large parts of the record carrier is avoided.

However, this requires much attention on the part of the user when information is being recorded of which the end is not clearly defined; such as, for example, music reproductions. A similar problem occurs when recording in started is that selecting the instant at which the music reproduction commences also requires the user's full attention.

The prior art device is arranged for recording additional information (such as, for example a so-called track number. A Table of Contents and the relative time code for Compact Disc signals) as a subcode which is related to the track numbers of the information signals which have already been recorded. This additional information must be adapted at the beginning of each new track. For example, the track number must be increased and the relative time code set at zero. Also the Table of Contents must be adapted.

In order to achieve that the subcode has always a correct relation with the already recorded information, the subcode must be adapted anew at the beginning of each track. This also requires much attention on the part of the user.

SUMMARY OF THE INVENTION

It is an object of the invention to provide recording means that require less attention on the part of the user. According to a first aspect of the invention a device according to the opening paragraph is characterized in that the device comprises a signal presence detector for detecting the presence of main information signals to be recorded on the basis of additional information therein as received of the input, and means for causing the additional information to be adapted in response to-a detection that at least during a predetermined first time interval there has been an interruption of the presence of said received information.

According to a second aspect of the invention a device according to the opening paragraph is characterized in that the device comprises a signal presence detector for detecting the presence of valid main information on the basis of the detected subcode information and means for effecting a start of the recording operation when the presence of said subcode information is detected.

The presence of an information signal may be established by means of a signal level detector. The use of such a signal level detector is to be preferred especially if the information signals are supplied in analog form. The signal presence detection may also be used for determining when the recording may be terminated.

An embodiment of the device in which this is realized is characterized, in that the device comprises means for causing the recording to be terminated in response to a detection that at least for a predetermined second time interval which is longer than the aforesaid first predetermined time interval the presence of said information signal has not been detected.

When a digital signal is supplied, a signal level detector may also be used for detecting the presence of an information signal, it is true, but it is relatively complex to derive the signal level of a digital information signal.

If the supplied digital signals comprise subcode signals, the presence of an information signal is preferably established on the basis of the subcode signal. An embodiment in which this is realized is characterized, in that the signal presence detector is arranged for detecting erroneously received subcode information on the basis of redundant information extended to the subcode information. In this embodiment the fact is used to advantage that the error detector for detecting erroneously received subcode information likewise denotes, by way of a lengthy error message, that no information is received.

Automatic adaptation of the aforementioned additional information which is related to the track number of the recorded information signal may be obtained on the basis of detection of a change in the subcode (of the received signal) which denotes the sequence number of the information signal in the information signal source that supplies the signal to be recorded to the recording device.

BRIEF DESCRIPTION OF THE DRAWINGS

Further embodiments as well as the advantages thereof will be described in detail with reference to the drawing FIGS. 1 to 7, in which.

DESCRIPTION OF THE PREFERRED EMBODIMENTS

Figure 1:
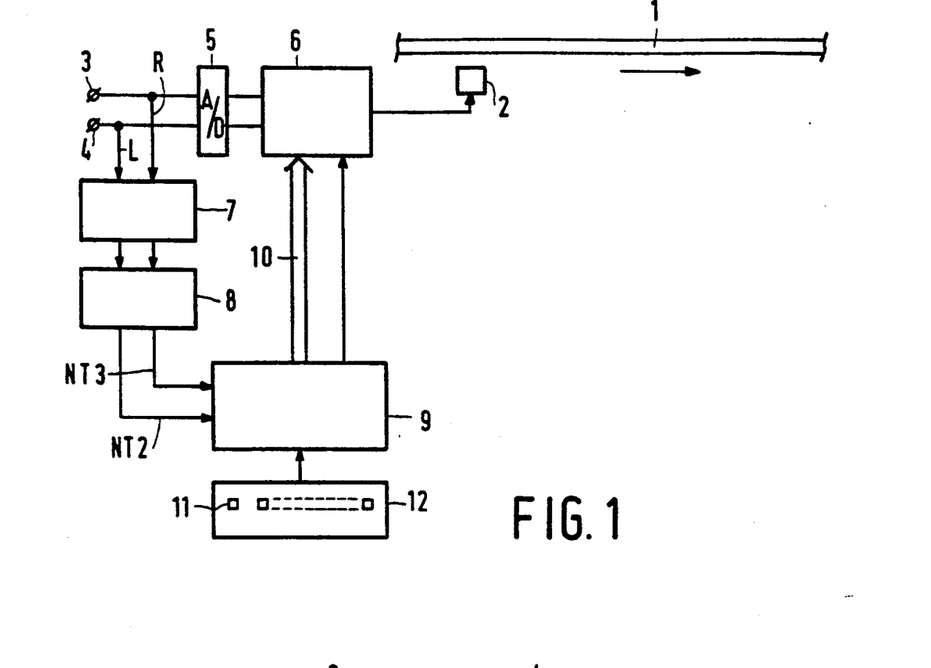
FIGS. 1, 5 and 7 show embodiments of recording devices according to the invention.

FIG. 1 shows a first embodiment of the device according to the invention. In this drawing Figure reference numeral 1 denotes a record carrier of a writable type. Such a record carrier may comprise a disc-like or tape-like record carrier of an optical, a magneto-optical or a magnetic type.

The device has two inputs 3 and 4 for receiving an analog signal, in this embodiment a stereo audio signal whose two subsignals are referenced R and L. The device further includes recording means for recording in digitized form the sequence of signals R and L received through inputs 3 and 4. In the embodiment shown of the recording device, the recording means comprise an analog-to-digital converter 5, a signal processor 6 and a write head 2. The analog-to-digital converter 5 is coupled to the inputs 3 and 4 for digitizing the analog signals R and L received through these inputs. The digitized signals are applied to the signal processor 6. The signal processor is of a customary type converting the digitized signals to a suitable control signal for the write head 2. The record carrier 1 is moved along the write head 2, so as to realise a scanning of the record carrier.

In response to the control signal produced by the signal processor 6 the write head 2 provides a digital information pattern on the record carrier 1 which pattern represents the analog signals R and L.

The device further includes a detection unit 7 for detecting the presence of an analog signal at the inputs 3 and 4. In this embodiment the detection unit 7 comprises two signal level detectors 20 and 21 (see FIG. 2) which are coupled to the inputs 3 and 4 for receiving the analog signals. The signal level detectors 20 and 21 are of a customary type producing a logic-1 signal if the envelope of the received analog signal exceeds a predetermined threshold Vref. The detection unit 7 is coupled to a time interval detection circuit 8 for detecting, on the basis of the logic signals ND1 and ND2 produced by the signal level detectors, whether the signal level of either of the two analog signals on inputs 3 and 4 remains below a threshold Vref for a time interval having a predetermined length T2, for example, 30 seconds. To this end the circuit 8 may comprise an OR gate 22 (see FIG. 2) for receiving the logic signals ND1 and ND2 produced by the two signal level detectors 20 and 21, and a retriggerable monostable multivibrator 23. The monostable vibrator 23 produces a logic-1 signal NT2 if the output signal of the OR gate 22 after a 1-0 transition of the output signal 0 continues to remain at the logic-0 value during the T2-long time interval. The signal NT2 produced by the multivibrator 23 is applied to a control circuit 9 of a customary type for controlling the recording and which is arranged for realizing a termination of the recording action in response to the logic-1 signal NT2 produced by the multivibrator 23.

The recording operation will automatically stop in the device shown in FIG. 1 if the two analog signals on inputs 3 and 4 both continue to be below the threshold Vref for a period of time of length T2. The value of Vref is selected very low, for example, a value corresponding to a −60 dB signal level. If the signal levels on the inputs 3 and 4 continue to be below this value for the relatively long period of time of length T2, the received signals R and L may be assumed not to contain information any longer. By stopping the recording it is avoided that information patterns not representing any useful information continue to be recorded on the record carrier. This is especially important in the case where the record carrier is of a write-once type, because it is then impossible to rewrite over the information pattern that does not represent any useful information. With the device according to the invention such waste of available storage capacity is thus reduced.

If the recording device is arranged for recording additional information which relates to the number of information signals already recorded, the signal level detectors may further be used for detecting a pause interval between two successive supplied analog information signals. This detection may be used for adapting the additional information.

Figure 2:
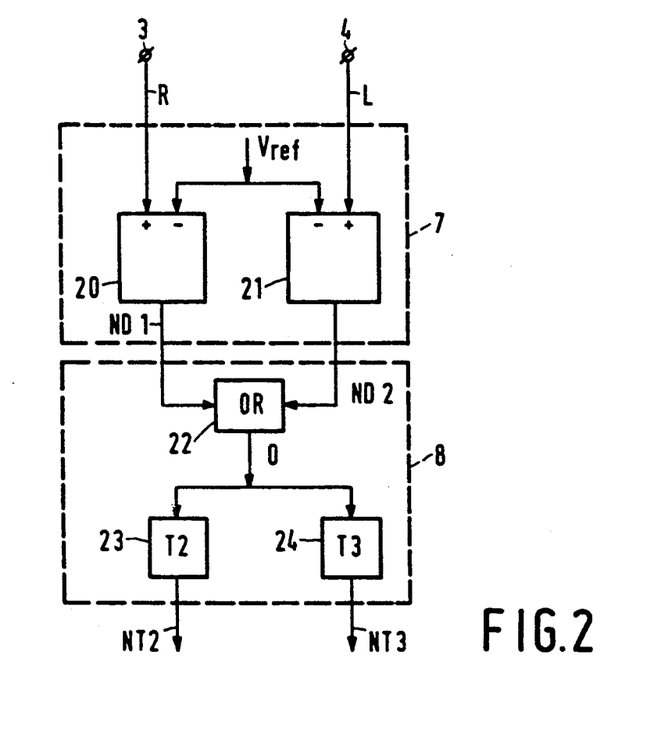
FIG. 2 shows a detailed diagram of a circuit used in the embodiment shown in FIG. 1, FIGS. 3 and 6 show flow charts of embodiments of control programs.

The control circuit 9 shown in FIG. 1 is adapted for generating the additional information in conventional manner and conveying it to the signal processor 6 by a signal bus 10. The additional information may comprise so-called subcode signals which are recorded together with the information signals when Compact Disc signals are recorded. These subcode signals comprise a so-called track number TNO which indicates the track number of the recorded information signal, which signal is also denoted by track. In addition, the subcode signal comprises a Table of Contents and a relative time code, to be referenced REL and TIM hereinafter, denoting the time relative to the beginning of the track. With each new track to be recorded the track number TNO is incremented by unity, the relative time is reset to zero, and the Table of Contents is adapted. Producing a new track, that is to say, adapting the track number and Table of Contents and resetting the relative time to zero, may be effected in response to a command fed by the user. For feeding such a command the recording device may comprise a key 11 intended for this purpose on the control panel 12 coupled to the control circuit 9. A new track may also be produced automatically in response to a detection of a pause interval between two successive analog signals to be recorded, by detecting whether the signal level on the two inputs 3 and 4 remains below the threshold Vref for a predetermined period of time T3. To this end the detection unit 8 comprises a second retriggerable monostable multivibrator 24 which produces a logic-1 signal NT3 if, subsequent to a 1-0 transition of the output of the OR gate 22, this output signal continues to have the logic-0 value for a period of time T3 shorter than T2. The logic output signal NT3 of the multivibrator 24 is fed to the control circuit 9, which produces a new track in response to the logic-1 value. The control circuit may be of a programmable type loaded with a suitable control program for adapting the additional information which is thereafter conveyed to the signal processor 6 by the bus 10. Albeit not necessary, the production of a new track is preferably postponed until the signal level on either input 3 or 4 has exceeded the threshold Vref again. This is advantageous because in the case where the signal has not exceeded the threshold Vref by the time T2 has passed, and thus the recording will be terminated automatically, producing a track not containing any useful information is avoided. Detecting whether either of the signals has again exceeded the threshold may be effected on the basis of the output signal of the OR gate 22 or on the basis of the output signal of the multivibrator 24.

Figure 3:
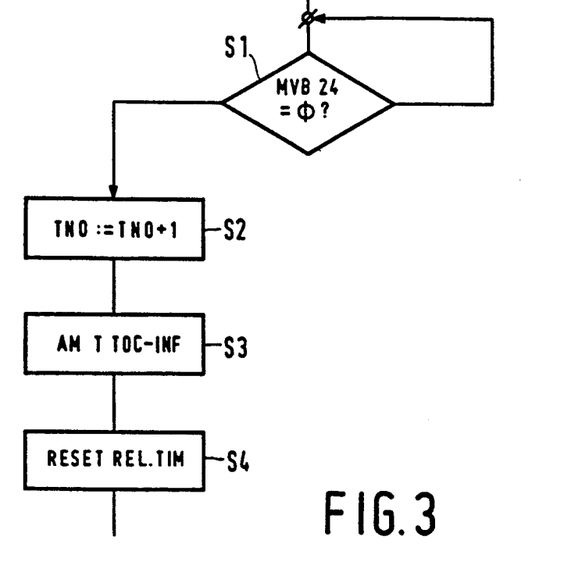

FIG. 3 shows a flow chart of a possible embodiment of a program for postponing recording of new track. This program is followed and is initiated, in reaction to a 0-1 transition of the output signal of the multivibrator 24 and is initiated, for example of priorart program interrupts. The program may comprise a conditional wait loop S1 in which the output signal NT3 of the multivibrator 24 again adopting the logic-0 value is waited for. The conditional wait loop S1 is followed by a step S2 in which a track number TNO is incremented by unity. Subsequently, in step S3, the initial address of the new track is stored in a memory of the control unit. This information can be used for composing a Table of Contents as is described in detail, for example, in Published EP-A-0 390 268, which patent application is hereby considered included in the description by means of reference. Step S3 is followed by step S4 in which the relative time stated in the subcode is reset to zero.

In the embodiment described hereinbefore the detection unit 7 and the interval detection unit 8 are described as separate hardware circuits. Needless to observe that the functions performed by the unit 7 and unit 8 may be realized in software. In that case an analog/-digital converter may be used for digitizing the signals R and L. The control unit may then perform the desired detection functions on the basis of the received digitized values of the signals R and L with the aid of a suitable program. In the aforedescribed embodiment the received signals are stereo audio signals. Self-evidently, the invention may also be applied to mono audio signals. In that case the decision for terminating the recording may be taken on the basis of a single input signal in lieu of two. Furthermore, it should be observed that it is advantageous to have the recording device comprise both a feature for automatic termination of recording and a feature for automatic production of a new track, because when one feature is used the realization of the other feature will hardly require any additional hardware because the signal level detectors may be used in common. However, either feature may be used separately.

Figure 4:
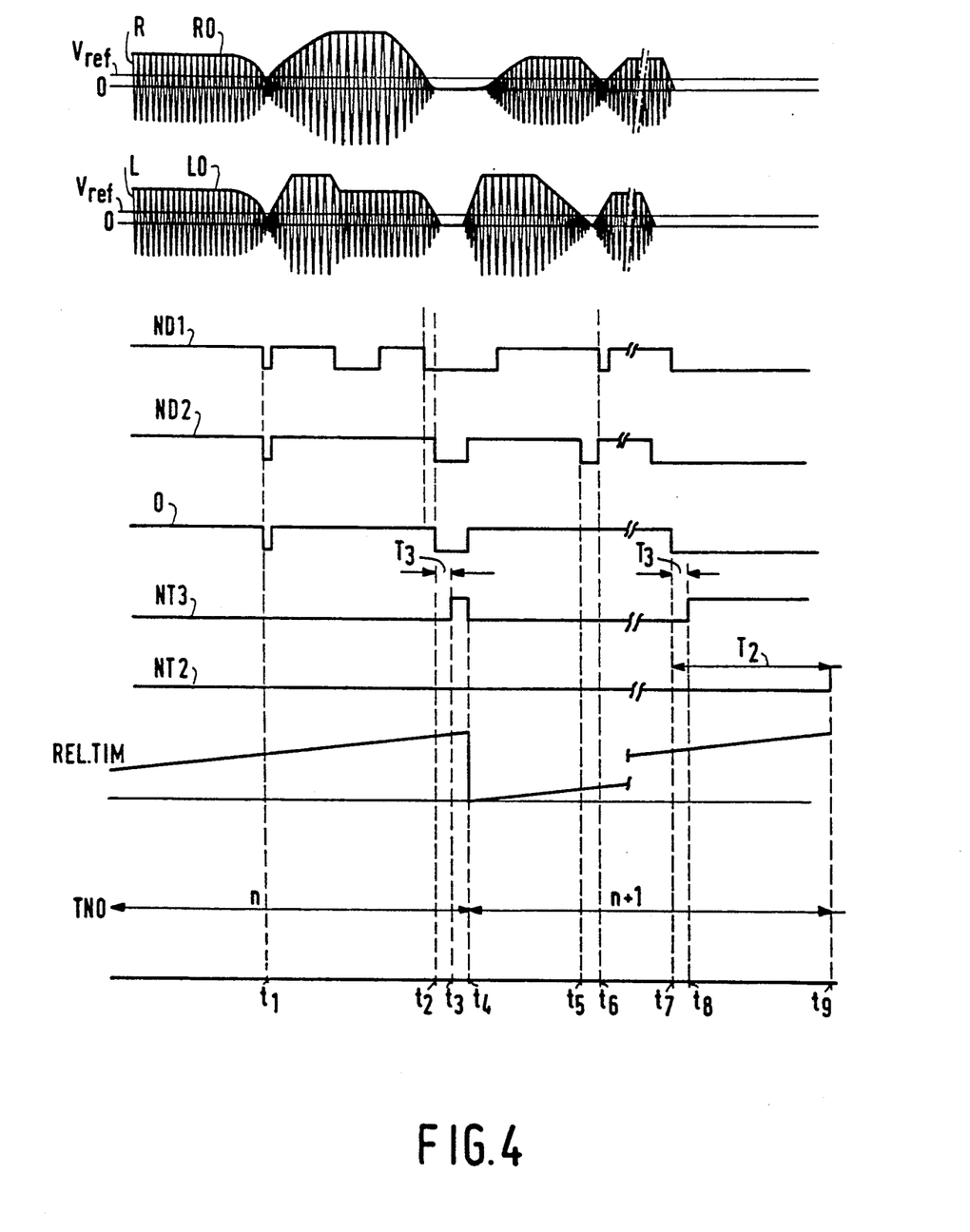
FIG. 4 shows a number of signals occurring in the recording device as shown in FIG. 1.

By way of illustration, FIG. 4 shows the signals R, L, ND1, ND2, O, NT2 and NT3 occurring in the embodiments shown in FIGS. 1 and 2 plotted against time t. In addition to the signals R and L, FIG. 4 also shows the envelopes of these signals. These envelopes are referenced RO and LO. Furthermore, FIG. 4 shows the variation of the track number and the relative time codes REL TIM. The envelopes RO and LO and thus also the signal levels R and L fall below the reference level Vref at instant t1. Before the time interval of length T3 has passed, the signal levels of the two signals R and L again exceed the reference level Vref, so that no 0-1 transition in the signal NT3 is generated. Such brief reductions of the signal levels, which regularly occur in audio signals, thus do not cause any adaptation of the track number TNO and relative time code REL TIM. At the instant t2 the signal R again intersects the level Vref and not long after, the signal L intersects the level Vref at the instant t3, which results in a 1-0 transition of the output signal 0 of the OR gate 22. Once the time interval of length T3 has passed, the logic value of the signal NT3 changes from 0 to 1 at instant t3. Consequently, the control program in the control circuit 9 is called and the logic value of NT3 is awaited to become 0 again. Once the signal NT3 has again adopted the value 0 (instant t4), the track number TNO is increased from n to n+1 and the absolute time code REL TIM is reset to zero. At the instants t5 and t6 only one of the two signals R and L becomes smaller than the value Vref. Such brief reductions of the signal level, which regularly occur in audio signals, do not cause an adaptation of the track number TNO and relative time code REL TIM.

At instant t7 the signal levels of the two signals R and L have dropped below the level Vref and continue to be below this level for a rather long time which is longer than the time interval T2, which is an indication that no new information signals are being supplied to be recorded and so the recording may be stopped. The output signal O of OR gate 22 at instant t7 exhibits a 1-0 transition. Once the time interval T3 has elapsed, the signal value of the signal NT3 changes from 0 to 1. However, this does not cause any adaptation of the track number TNO and the relative time codes REL TIM, because the signal levels of the two signals R and L no longer exceed the level Vref until a time interval T2 has elapsed. Once the time interval T2 is over, the signal NT2 adopts the logic-1 value and the recording is stopped when a suitable control program is executed by the control circuit 9.

Figure 5:
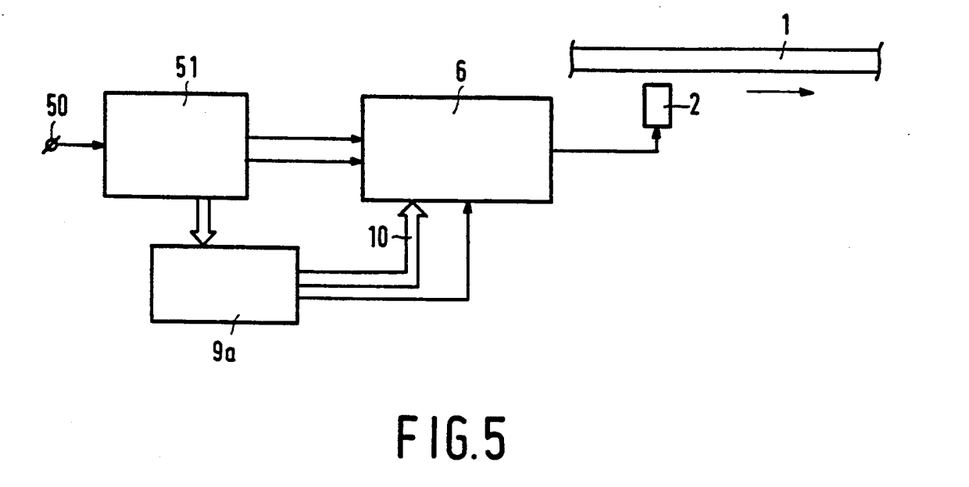

FIG. 5 shows a further embodiment of the recording device, which is suitable for recording information received in digitized form. In this drawing Figure the elements corresponding to those of the embodiment shown in FIG. 1 are denoted by like reference numerals. The embodiment shown in FIG. 5 has a digital input coupled to the input of a so-called digital audio interface circuit 51 for receiving digital audio information that has been transmitted in accordance with the digital audio interface standard as described in IEC958 standard. The digital interface circuit 51 may, for example, comprise an integrated circuit known by the type number of CX23053.

During the transmission, in accordance with the digital audio standard, of information read from a Compact Disc, the subcode information including the so-called track number is transmitted together with the digital audio information. The digital audio interface circuit presents the received digital audio information to the signal processor 6 whilst the received subcode information is presented to a recording control circuit 9a which largely corresponds to the recording control circuit of the embodiment shown in FIG. 1, but which has different provisions for initiation of the production of a new track and for the initiation of the termination of the recording. The control circuit 9a determines, on the basis of the subcode produced by the circuit 51, whether a new track is to be produced or whether the recording is to be terminated. For this purpose, the control circuit 9a may be a suitable hardware circuit. If the control circuit is of a programmable type, it may be loaded with a suitable control program.

Figure 6:
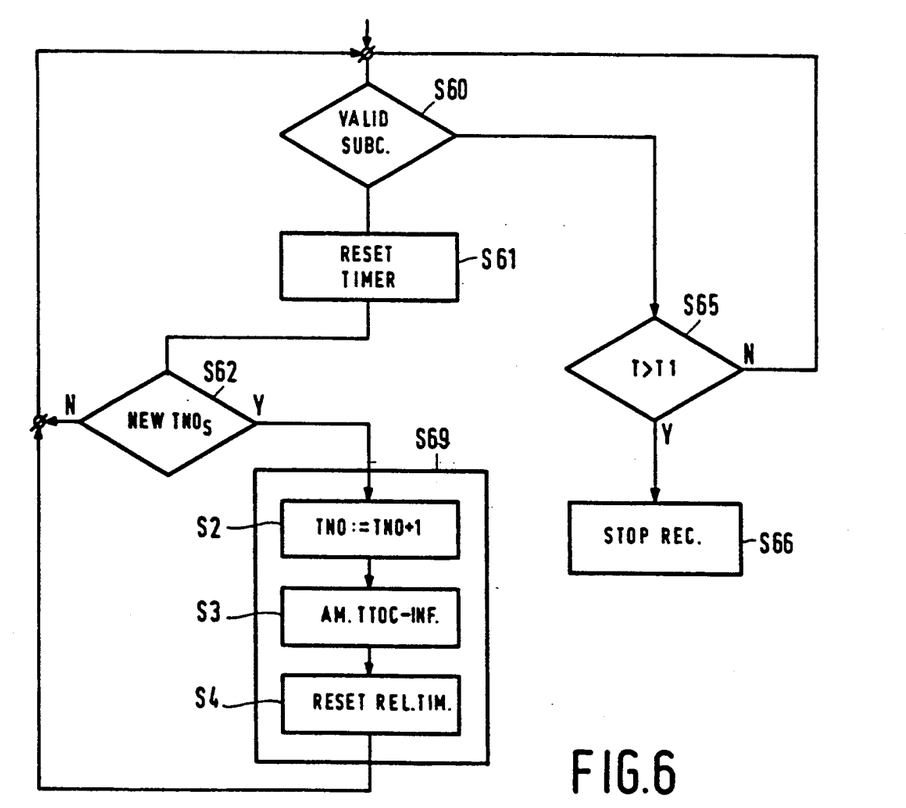

FIG. 6 shows a flow chart of such a control program. The program comprises a step S60 in which it is verified whether information to be recorded is available on the input. This may be effected by testing the so-called validity flag expressed by the subcode of received information formatted according to said digital audio standard. This validity flag denotes whether the received information is to be considered valid. If the received digital audio information comes from a Compact Disc player, the contents of the so-called subcode Q channel are co-transmitted. The subcode Q channel contains the data such as relative time, track number and Table of Contents. In addition, the subcode Q channel contains redundant information for the purpose of error detection. When an error detector is used, which is preferably included in circuit 51, the output signal of this detector denotes whether the contents of the transmitted subcode Q channel have been received without errors. If no information is transmitted, the error detector denotes that no error-free subcode has been received, so that the output signal of the error detector may be used for detecting the presence of information to be recorded. If, when step S60 is executed, there is established, on the basis of the error detector output signal, that information to be recorded is present, the subcode information present on the outputs of the circuit 51 is recorded when step S61 is executed and, in addition, a timer, for example, a software timer, is set to zero. Subsequently, step S62 is executed in which there is verified whether the track number in the newly recorded subcode differs from the track number in the previously recorded subcode. If not, the program is continued with step S60. However, if the track number appears to have changed, this means that a track number change in the received digital audio signal has changed since the previous-but-one recording of the subcode, and so a new track should be produced in the recording device. This production is effected while step S64 is executed. This step comprises the steps S2, S3 and S4 as described with reference to FIG. 3. Once step S64 has been executed, step S60 is again executed.

If it appears that no valid information is received on the input when step S60 is executed, step S65 is executed. When this step is executed, it is verified whether the elapsed time denoted by the timer is longer than a value T1, for example, 6 seconds. If not, step S60 is proceeded to. If so, no digital audio information is assumed to be supplied any longer, after which step S66 is executed. When step S66 is executed, the recording is terminated in a customary fashion under the control of the control circuit 9a. In afore-described control program the relative time is set to zero immediately when the track number is incremented when the new track is produced during the execution of step S64.

If the received digital audio information comes from a Compact Disc player, the audio information proper may be preceded by a pause interval. In that case, a different manner of track production may be preferable which will be further discussed hereinafter. In the case of signals composed according to the Compact Disc audio standard, the change of the track number may coincide with the beginning of the pause interval. During the pause interval the Table of Contents included in the subcode is equal to zero and the relative time decreases to zero. The instant at which the relative time becomes zero coincides with the end of the pause interval. The recording of the pause interval may be effected as follows: after a change of the track number in the received subcode there is detected whether the Table of Contents is equal to zero. If it is, the relative time is taken from the received subcode and is used as an initial value of the relative time of the recorded subcode. Subsequently, an ever decreasing relative time is recorded together with a Table of Contents equal to zero. The moment the relative time of the subcode to be recorded has decreased to zero, the Table of Contents to be recorded is adapted and a relative time increasing with time is recorded.

If the Table of Contents of the received subcode is unequal to zero when there is a track number change, the relative time in the subcode is set to zero immediately after a track number change has been detected. In this fashion a recording is obtained which always meets the requirements set by the Compact Disc standard. This is contrary to a recording in which the recorded relative time is taken from the received subcode. In the latter case there may be leaps in the relative time in the recorded signal if the received relative time shows a leap, for example, due to leaps to other track portions in the recording device which supplies the digital audio information.

Figure 7:
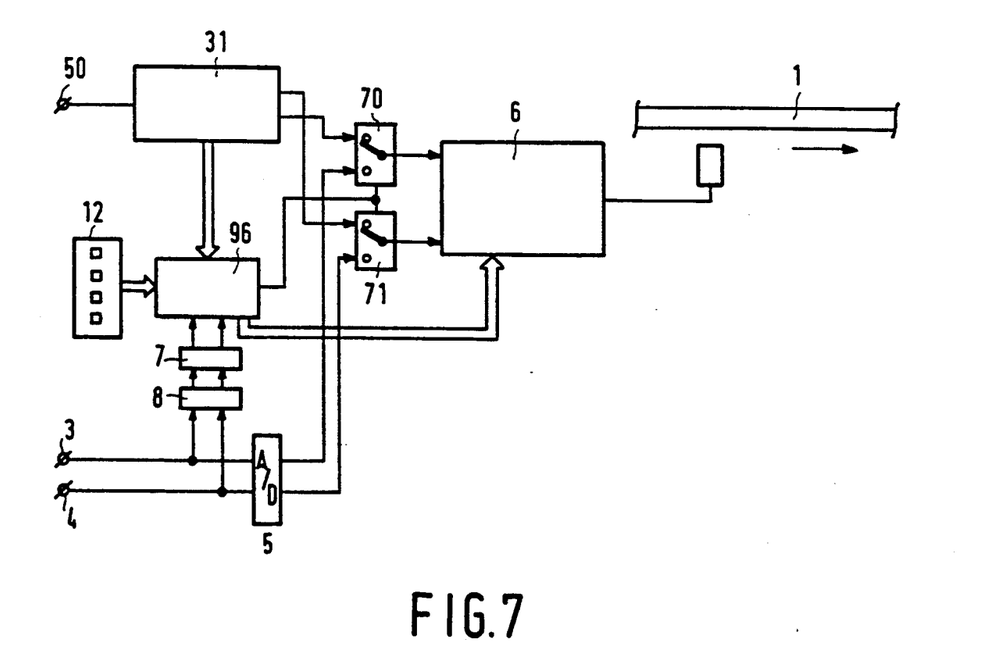

FIG. 7 shows an embodiment of the recording device according to the invention suitable for recording audio information that is supplied in analog or digital form. In this drawing Figure the elements corresponding to those shown in the FIGS. 1 and 5 are denoted by like reference numerals. The embodiment shown in FIG. 7 comprises a control panel 12a which includes a selection key by which a selection may be made between the use of analog inputs 3 and 4 and the digital inputs 50. The control panel is arranged for applying a control signal corresponding to the selection made by way of the selection key to a control circuit 9b which comprises all the features of the aforementioned control circuits 9 and 9a, but which additionally includes a control program which derives a control signal for two multiplex circuits 70 and 71 from the control signal received from the control panel 12a. The multiplex circuits 70 and 71 have inputs coupled to the outputs of the analog-to-digital converter 5 and to the digital audio-interface circuit 51 for receiving the digital audio signals originating therefrom. The multiplex circuits have outputs coupled to the inputs of the signal processor 6. The multiplex circuits 70 and 71 are of a customary type which transfer either of the two signals on the input to its output in response to the received control signal.

The embodiment shown in FIG. 7 is advantageous in that it is suitable for recording both audio information supplied in analog form and digital audio information, audio information as well as subcode information digitized according to a digital audio interface format being transmitted. Automatically stopping and automatically producing a new track is then adapted to the form in which the information to be recorded is supplied.

In afore-described embodiments there is determined on the basis of information at the input whether the recording is to be terminated. If this information denotes that no information is being supplied for longer than a predetermined length of time, the recording is automatically terminated. This information, however, may also be used for automatically starting recording. In that case it is detected whether there is a change from a state in which there is no information to be recorded at the input to a state in which information to be recorded is present. It is then desirable for the recording to be commenced virtually immediately after the information has become available. The automatic stop feature may then be realized apart from the features of automatic track production and automatic recording stop. The combination of these three features in the same device, however, is attractive because all three features utilize largely the same functions.

Finally, it should be observed that the invention is not restricted to recording audio signals, but that the invention may be equally utilized for other signals such as video signals.

We claim:
1. Apparatus for recording on a record carrier a succession of information signals which are received at an input of such apparatus at various intervals therebetween, said apparatus comprising:
control means for generating auxiliary information to be associated with a received information signal during recording thereof, the auxiliary information being adapted in relationship to the associated information signal;
recording means coupled to said input and to said control means for converting each received information signal and the associated auxiliary information into a recording signal for controlling a write head to record the record carrier in accordance with said recording signal; and
signal presence detecting means coupled to said input for detecting whether a presently received information signal is valid for recording and is received at least a first predetermined time interval (T3) after a last previous information signal which was valid for recording, and in that event to supply a control signal to said control means to cause it to adapt the auxiliary information generated thereby so as to relate to the presently received information signal.

2. Apparatus as claimed in claim 1, wherein said signal presence detecting means comprises means coupled to said input and to said control means for detecting whether a second predetermined time interval (T2) longer than said first time interval (T3) has elapsed since an information signal which is valid for recording was last received at said input, and in that event to supply a control signal to said control means to cause it to control said recording means to interrupt recording on the record carrier.

3. Apparatus as claimed in claim 2, wherein said signal presence detecting means comprises means for detecting whether said first predetermined time interval (T3) has elapsed since an information signal which is valid for recording was last received at said input, and in that event to supply a control signal to said control means to cause it to interrupt generation of auxiliary information until an information signal which is valid for recording is subsequently received at said input.

4. Apparatus as claimed in claim 3, wherein the received information signals to be recorded are digital signals which include main information and subcode information, the subcode information indicating whether the main information is valid for recording; and said signal presence detecting means comprises a subcode detector for determining from the subcode information in a received information signal whether such signal is valid for recording.

5. Apparatus as claimed in claim 4, wherein the subcode detector is adapted to determine from the subcode information in a received information signal whether a track number of such signal has changed from a track number of a last previously received information signal which was valid for recording, and in that event to cause said control means to adapt the auxiliary information signal generated thereby to correspond with the changed track number.

6. Apparatus as claimed in claim 4, wherein the subcode detector is further adapted to determine from the subcode information in a received information signal whether said subcode information is erroneous, such determination being made on the basis of information in said signal which is redundant to said subcode information.

7. Apparatus as claimed in claim 2, wherein the received information signals to be recorded are digital signals which include main information and subcode information, the subcode information indicating whether the main information is valid for recording; and said signal presence detecting means comprises a subcode detector for determining from the subcode information in a received information signal whether such signal is valid for recording.

8. Apparatus as claimed in claim 7, wherein the subcode detector is further adapted to determine from the subcode information in a received information signal whether said subcode information is erroneous, such determination being made on the basis of information in said signal which is redundant to said subcode information.

9. Apparatus as claimed in claim 7, wherein the subcode detector is adapted to determine from the subcode information in a received information signal whether a track number of such signal has changed from a track number of a last previously received information signal which was valid for recording, and in that event to cause said control means to adapt the auxiliary information signal generated thereby to correspond with the changed track number.

10. Apparatus as claimed in claim 1, wherein said signal presence detecting means comprises means for detecting whether said first predetermined time interval (T3) has elapsed since an information signal which is valid for recording was last received at said input, and in that event to supply a control signal to said control means to cause it to interrupt generation of auxiliary information until an information signal which is valid for recording is subsequently received at said input.

11. Apparatus as claimed in claim 10, wherein the received information signals to be recorded are digital signals which include main information and subcode information, the subcode information indicating whether the main information is valid for recording; and said signal presence detecting means comprises a subcode detector for determining from the subcode information in a received information signal whether such signal is valid for recording.

12. Apparatus as claimed in claim 11, wherein the subcode detector is further adapted to determine from the subcode information in a received information signal whether said subcode information is erroneous, such determination being made on the basis of information in said signal which is redundant to said subcode information.

13. Apparatus as claimed in claim 11, wherein the subcode detector is adapted to determine from the subcode information in a received information signal whether a track number of such signal has changed from a track number of a last previously received information signal which was valid for recording, and in that event to cause said control means to adapt the auxiliary information signal generated thereby to correspond with the changed track number.

14. Apparatus as claimed in claim 1, wherein the received information signals to be recorded are digital signals which include main information and subcode information, the subcode information indicating whether the main information is valid for recording; and said signal presence detecting means comprises a subcode detector for determining from the subcode information in a received information signal whether such signal is valid for recording.

15. Apparatus as claimed in claim 14, wherein the subcode detector is further adapted to determine from the subcode information in a received information signal whether said subcode information is erroneous, such determination being made on the basis of information in said signal which is redundant to said subcode information.

16. Apparatus as claimed in claim 14, wherein the subcode detector is adapted to determine from the subcode information in a received information signal whether a track number of such signal has changed from a track number of a last previously received information signal which was valid for recording, and in that event to cause said control means to adapt the auxiliary information signal generated thereby to correspond with the changed track number.

17. Apparatus as claimed in claim 1, wherein the received information signals to be recorded are digital signals which include main information and subcode information, and said signal presence detecting means detects whether a received signal is valid on the basis of the subcode information therein.

18. Apparatus as claimed in claim 1, wherein the received information signals to be recorded are digital signals which include main information, subcode information and auxiliary information which is at least partially redundant to the subcode information; and said signal presence detecting means detects whether a received signal is valid based on the auxiliary information which is redundant to the subcode information therein.

* * * * *